(12) United States Patent
Bruno

(10) Patent No.: US 7,734,099 B2
(45) Date of Patent: Jun. 8, 2010

(54) METHOD AND SYSTEM FOR GENERATING POLYGONAL BOUNDARY DEFINITIONS FOR IMAGE OBJECTS

(75) Inventor: Jeanette Marie Bruno, Saratoga Springs, NY (US)

(73) Assignee: General Electric Company, Niskayuna, NY (US)

( * ) Notice: Subject to any disclaimer, the term of this patent is extended or adjusted under 35 U.S.C. 154(b) by 1128 days.

(21) Appl. No.: 11/271,711

(22) Filed: Nov. 11, 2005

(65) Prior Publication Data

US 2007/0110318 A1    May 17, 2007

(51) Int. Cl.
*G06K 9/48*    (2006.01)
(52) U.S. Cl. ...................................... 382/199
(58) Field of Classification Search ................. 382/197, 382/199, 242, 245
See application file for complete search history.

(56) References Cited

U.S. PATENT DOCUMENTS 5,666,439 A * 9/1997 Ishida et al. ................ 382/190
5,694,486 A * 12/1997 Shigeeda et al. ............ 382/197
5,757,961 A * 5/1998 Yamakawa et al. .......... 382/197
6,826,500 B2 11/2004 Linthicum et al.
7,269,298 B2 * 9/2007 Tanaka ....................... 382/289

OTHER PUBLICATIONS

William O. McCallister et al., "Image Segmentation Using Dynamic Run-Length Coding Technique", "Image Analysis", 2003, pp. 343-348, vol. 2749, Springer-Verlag Berlin Heidelberg, XP002474204.
Alvy Ray Smith, "Tint Fill", Siggraph 79, 1979, pp. 276-283, XP002474203.
Foley J. D. et al, "Computer Graphics Principles and Practice, second edition in C", 1999, pp. 979-982, Addison-Wesley Publishing Company, XP002474205.

* cited by examiner

*Primary Examiner*—Yon Couso
(74) *Attorney, Agent, or Firm*—Patrick K. Patnode

(57) ABSTRACT

Image objects within two-dimensional images are identified by locating boundary points that describe line segments that define a polygon outlining each object. Processing follows lines of pixels between boundary points to determine whether additional pixels are a part of the same image object by reference to a discriminator, such as color. Boundary points are thus identified for contiguous pixels and contiguous lines. Arm-like regions are identified by recursive analysis in a similar manner. The resulting boundary point list may serve to identify the image object, such as for labeling or tagging in web-based manuals, catalogs, and so forth.

20 Claims, 5 Drawing Sheets

METHOD AND SYSTEM FOR GENERATING POLYGONAL BOUNDARY DEFINITIONS FOR IMAGE OBJECTS

BACKGROUND

The present invention relates generally to the field of image rendering and image segmentation. More particularly, the invention relates to the identification of pixels in a digital image that are part of a desired grouping or item for identification of the grouping or item boundary.

A range of applications exist for digital image rendering. In one set of applications, a two-dimensional (2D) image is displayed on a computer screen and specific items visible in the image are segmented for tagging in a display or web protocol. The tagging permits information relating to the items to be called up for display by a user. Such tagging may create so-called "hot links" to the related information on a part or assembly. Increasing interest exists in the field of information systems for such hot linking, particularly for catalogs, manuals, and so forth. However, many other applications exist for similar linking to related information relating to specific image items, such as in the medical field.

A difficulty encountered in segmenting portions of an image for such linking, and for other purposes, involves the process of identification of a polygon that describes the item boundaries. Conventionally, such boundaries have been defined manually in an extremely time-consuming process. The resulting cost of boundary identification for such tagging has severely limited the degree to which such 2D image element hot linking has been used. Complex algorithms have been devised for identification of element boundaries. However, their complexity and relative computational inefficiency also makes them limited in their use.

A need exists, therefore, for improved approaches to identification of boundaries of image objects. There exists a particular need that can be implemented in a straightforward manner and that is computationally efficient.

BRIEF DESCRIPTION

The present invention provides a system and method for identifying boundaries for image objects designed to respond to such needs. The methods may be applied to a range of images, but are particularly well-suited to images created in computer-aided design (CAD) programs. The methods begin the identification with a known point in an image object, and proceed to identify adjacent points sharing a characteristic that may serve as a discriminator, such as color. By progressing through rows or columns of pixels sharing the discriminator, the algorithm builds a list of boundary pixels such that the boundary pixel lists are ordered to produce line segments that define a polygon that describes the item boundaries. The boundary pixel list may be augmented by recursively identifying boundaries of contiguous regions of the object. The boundaries of such contiguous regions are added to the boundary pixel list, in the appropriate order and position, to produce a polygon that fully defines the image object.

The ultimate list of boundary pixels may then be reduced. Where three or more pixels lie in a line, for example, intermediate pixels may be deleted from the list to reduce the size of the boundary pixel list. Similarly, where boundary pixels form triangles, certain pixels in the triangle (e.g., an apex) may be deleted from the list. Such deletion may also be overridden by criteria relating to the area included or eliminated by the elimination of apex pixels from the boundary pixel list.

The resulting boundary pixel list then describes a polygon that can then be used to identify the boundary of the image object for any range of purposes. For example, the boundaries may be used to tag a specific area in a 2D image for hot linking. The boundary may also be used for measurement purposes, relating elements to various data pertaining to elements (e.g., other than via hot linking), and so forth.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
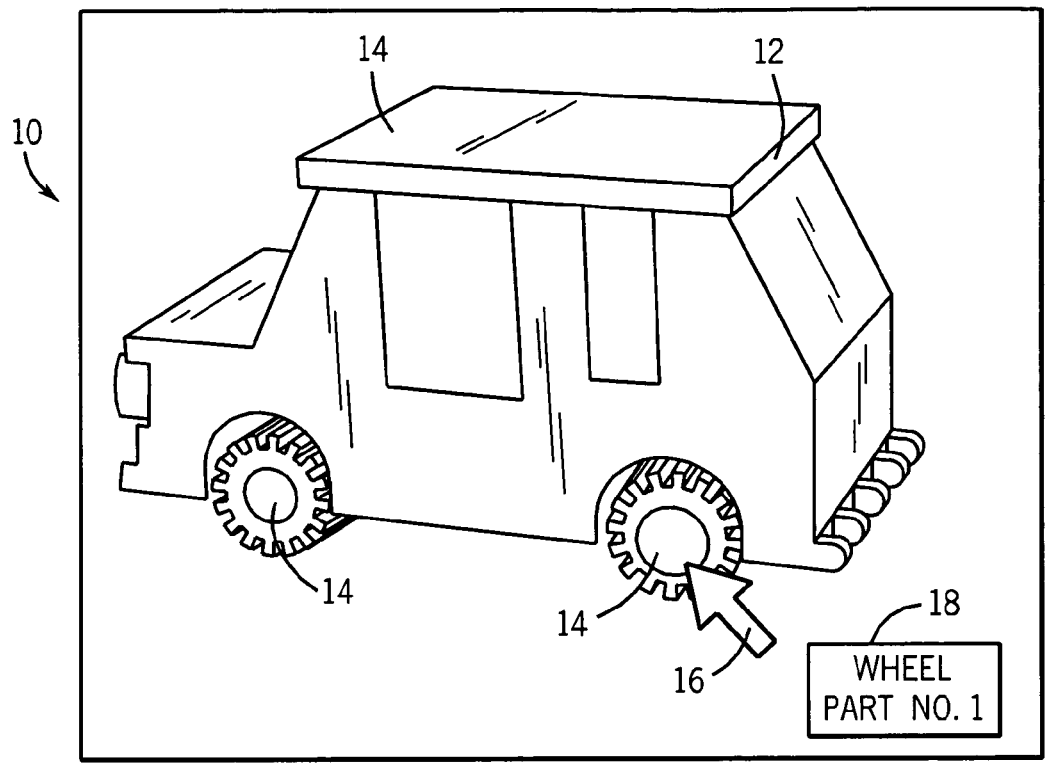
FIG. 1 is an exemplary 2D image of the type that may be analyzed and processed in accordance with the present invention.

Turning now to the drawings and referring first to FIG. 1, an exemplary 2D image 10 is illustrated consisting of an assembly of image objects. In the illustrated example, the 2D image is of a toy car. Clearly, any suitable assembly of objects or even single objects can be analyzed and processed in accordance with the present invention. Moreover, it should be noted that the image presented in FIG. 1 is illustrated as it might appear on a computer screen. In general, the present invention facilitates analysis of digitized images to identify boundaries of image objects of interest. The view shown in FIG. 1, may, for example, be part of a digital catalog, manual, web tool, and so forth. The image will typically be stored in any conventional manner on a digital memory device and served to a user via a monitor. The image, where available as a web page, may be displayed in a conventional browser or other viewing application. Details of such browsers have been eliminated from the views of the Figures for the sake of clarity.

The assembly 12, as illustrated, includes a plurality of objects or parts 14. In a practical application, such objects may be distinguished by the boundary identification processes described below, such as for facilitating their identification in an actual model or assembly, for part ordering, for maintenance and servicing, or for any other purpose. As shown, a cursor 16 may be moved over the image 10, and data such as illustrated at reference numeral 18, may be displayed. Any range of techniques may be provided for such display. In general, the display may include identification information, links to additional catalog or specification data, and so forth. Such techniques for linking the object to additional data are conventionally referred to as "hot links". In the illustrated example, the cursor 16 is held over a region or object of the image 20 which represents a wheel of the toy vehicle.

While the present discussion relates generally to objects and more particularly to assemblies of objects, it should be noted that the present techniques are in no may limited to mechanical or any particular types of applications or image objects. For example, the techniques may be employed for identifying any image feature of interest. As described below, the pixels and boundaries of a particular object are identified by reference to some discriminator. Thus, in any application where an identifiable discriminator is available for determining pixels that form part of an identified object, the present boundary identification algorithms may be employed. These might include identification of features of interest in medical images, identification of objects in baggage or parcels, identification of people or vehicles, identification of indicia, such as writing visible in an image, and so forth. Moreover, as described herein, a convenient discriminator in many images will be color. Other discriminators may include such characteristics or qualities as gray scales, and even simple listings of pixels contained within particular objects or regions of an image.

Figure 2:
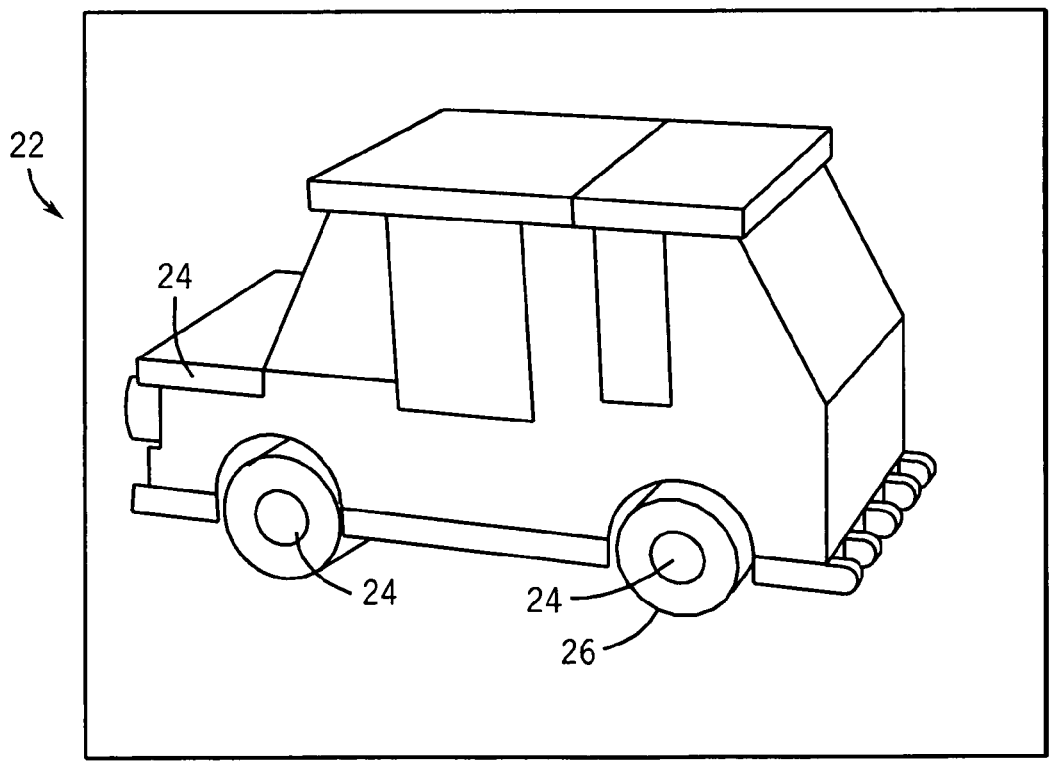
FIG. 2 is a view of the image of FIG. 1 without shading and illustrating image objects that may be analyzed and for which boundaries may be determined in accordance with the present invention.

In the example illustrated, the image 10 of FIG. 1 may be generated in or converted to a computer aided design (CAD) application. As will be appreciated by those skilled in the art, such applications permit enhancement by the addition of certain colors, shading, and so forth. FIG. 2 is an illustration of the same image as shown in FIG. 1, but with shading removed. The unshaded image 22 becomes a pure-color image in which the objects of FIG. 1 are rendered as colored regions only. Indeed, in a typical image of this type, the unshaded version 22 is stored and available for analysis as described below. Again, however, any type of discriminator other than color that permits boundary points to be identified as described below may be employed. As noted above, the various objects visible in the unshaded image 22 will appear as regions of color 24. The wheel 20 of FIG. 1 will thus appear as a color region 26.

The objects of the image may be selected by a user, or selected automatically for boundary determination. For example, given the image of FIGS. 1 and 2, a user may select various parts, such as the rear left wheel 20 of FIG. 1, represented by the region 26 in FIG. 2, for analysis. In a typical CAD application, a list will be available to the user of the various colors of objects in the image, and the object names. Once an object is selected or is automatically to be analyzed, processing follows generally as described below.

Figure 3:
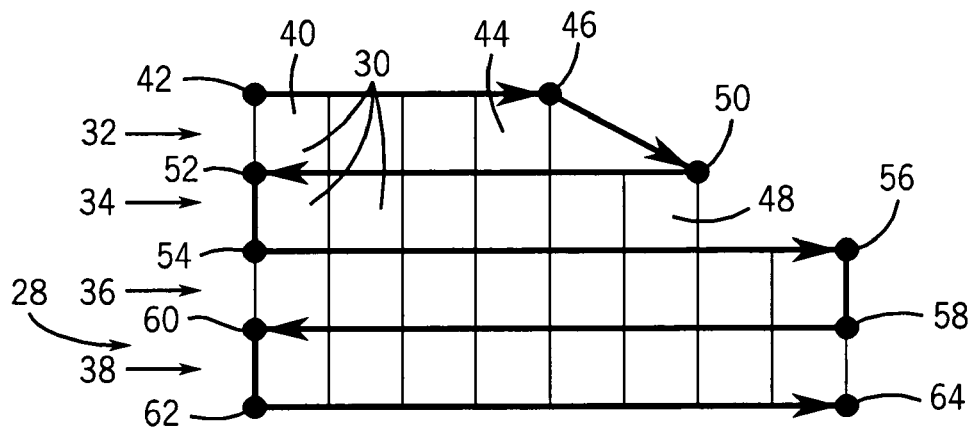
FIG. 3 is a diagram of an exemplary image object illustrating a manner in which boundary points or pixels of the object are determined.

Referring to FIG. 3, a simplified object 28 is illustrated as it would be analyzed in accordance with the present invention. The object includes a series of rows of pixels 30. Four such rows 32, 34, 36 and 38 are shown in FIG. 3. For example, the first row includes four pixels, whereas the following rows include greater numbers.

The present boundary identification algorithm begins at an upper leftmost pixel 40 of the image object to be analyzed. Processing continues along rows and then downwardly along subsequent rows until all pixels of the object are identified. It should be noted that, while the present processing begins in the upper left of the object and proceeds in an alternating left-to-right and right-to-left, top-to-bottom fashion, any other direction and order of processing may be used. Thus, analysis beginning at a different extremity of the image object, and processing from bottom-to-top, right-to-left, or a combination of these may be employed. Similarly, processing may begin at other than a boundary point, that is, within the image object itself. Finally, as described in greater detail below, the present invention allows for identification of occluded regions of the object that are contiguous and thus form part of the object. Their identification is performed by recursively examining the boundaries of such regions as they are located. Such recursive processing may proceed in various orders, either as a temporary interruption to the boundary point identification of the main region, or subsequently.

As a general overview, the processing will build lists of the leftmost and rightmost points for a given region. These two lists, when concatenated will form a list of points defining the line segments that describe a polygon that encapsulates the region. The algorithm is initialized with empty leftmost and rightmost points lists. The algorithm then starts at a contiguous region's leftmost pixel on a given row, and it traverses right on that row until it finds the region's rightmost pixel on that same row. Then it will find the region's rightmost pixel in the next row and traverse left to find the region's leftmost pixel in that next row. The two leftmost points (from the initial and next row) are added to a "leftmost points" list. The two rightmost points are added to a "rightmost points" list. The processing then moves down to the next pair of rows in the region finding the two leftmost and two rightmost points for this pair and adding them respectively to the leftmost and rightmost points list. The processing repeats with each pair of rows till there are no more rows left in the region.

As a more detailed explanation, returning to FIG. 3, the first pixel 40 identified at an uppermost and leftmost position will be marked as a left boundary point 42. This boundary point will be appended to a list of left boundary points accumulated for the object, and stored in a digitized list. From the first pixel 40, it is determined whether the next pixel adjacent to pixel 40 and to the right of pixel 40 shares a discriminating criterion with pixel 40. In the present embodiment, the discriminator is color. Thus, if the pixel immediately adjacent to pixel 40 and to the right of pixel 40 is the same color as pixel 40, processing proceeds by then analyzing whether its right-hand neighbor is of the same color. Processing proceeds in this manner until the result of the inquiry is negative. That is, a rightmost pixel 44 will ultimately be identified in row 32 because its right-hand neighbor (not shown in FIG. 3) is not of the same color. At this point, a right boundary point 46 is identified and stored in memory by appending it to a right boundary points list. In a present embodiment, as pixels are identified as part of the image object, their color values are altered to indicate that they have been located and processed.

Once a rightmost boundary pixel is identified in a row, the processing proceeds to the next lower row below the identified rightmost boundary pixel. It is next determined whether this pixel is of the same color (i.e., part of the same image object), and if so, whether there are any further pixels to the right of this new pixel that are of the same color. By continuing to the right in this manner, a new rightmost boundary pixel, such as pixel 48 in row 34 of FIG. 3, is identified. If the pixel on the next lower row, beneath the rightmost pixel of the first row is not part of the same image object (not the same color), then it is determined if there is a pixel to the left, on this same next row, and to the right of the first row's leftmost pixel. If there is such a pixel, then this is the new rightmost pixel of this next row (again such as pixel 48 in row 34 of FIG. 3). A point 50 is thus marked for this boundary. Once this rightmost pixel in the subsequent row has been identified, this rightmost pixel is appended to the rightmost pixels list and processing continues in a manner described above, but to the left. That is, it is determined whether the left-hand neighbor of the rightmost boundary pixel 48 is of the same color. If it is, processing continues to identify all of the neighboring pixels sharing the same color, until the result of the inquiry is negative. That is, in the example illustrated in FIG. 3, a leftmost boundary pixel will ultimately located in row 34 corresponding to a boundary point 52 and this leftmost boundary pixel will be appended to the leftmost pixels list. If no rightmost pixel is located between the leftmost and rightmost boundary pixels of the prior row, then the processing of the region is complete. The prior row's leftmost and rightmost pixels are appended, respectively, to the leftmost and rightmost pixels lists and the processing proceeds with merging the two lists, as described in below, to produce the list of boundary points that define the polygon describing the region just processed.

From the pixel at boundary point 52, the processing continues with the next lower row 36. If the pixel below the boundary pixel at point 52 is of the same color, this pixel is known to be within the image object. The algorithm will then verify whether any pixels to the left of that pixel are of the same color in order to locate the leftmost boundary pixel in row 36. If the pixel below the boundary pixel is not of the same color, the algorithm will verify whether any pixels to the right of that pixel, but still to the left of the prior row's rightmost boundary pixel is of the same color in order to locate the leftmost boundary pixel in row 36. If no leftmost pixel is located between the leftmost and rightmost boundary pixels of the prior row, then the processing of the region is complete. The prior row's leftmost and rightmost pixels are appended, respectively, to the leftmost and rightmost pixels lists and the processing proceeds with merging the two lists, as described below, to produce the list of boundary points that define the polygon describing the region just processed. In the example illustrated in FIG. 3, no pixels are present in the image object to the left of this point. Thus, another boundary point 54 will be added to the boundary point list. Processing continues in this manner to identify all boundary points 56, 58, 60, 62 and 64 as shown in FIG. 3.

Figure 4:
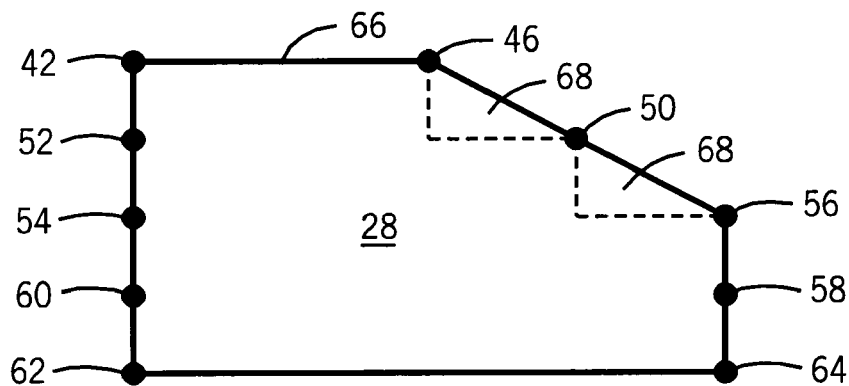
FIG. 4 is a diagram of the object of FIG. 3 following identification of boundary points.
Figure 5:
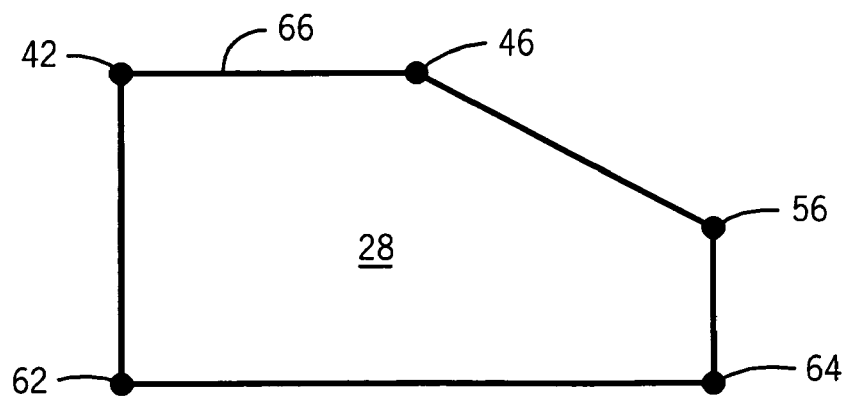
FIG. 5 is a diagram of the image object of FIGS. 3 and 4 following reduction of the number or list of boundary points.

The foregoing processing produces a list of left and right boundary points as illustrated in FIG. 3. The right points list may then be reversed and concatenated to the left boundary points, or vise versa, to obtain a set of points that define the polygonal boundary of the object. FIG. 4 illustrates the polygonal boundary identified by this boundary point list. The boundary 66 will generally trace the image object, but may include areas 68 that were not part of the original image object. Thus, in a complex assembly, some overlap may occur between image objects owing to the over-inclusion of such areas. Where desired, actual boundary points corresponding to the actual orthogonal boundary lines may be employed, or triangles such as illustrated in FIG. 4 may be simply included in one image object or the other. In a present implementation, moreover, a test may be used to determine whether such areas should be included in the image object boundaries or not. Such tests may be based upon comparison of the areas included in such triangles with a threshold area.

Where desired, the number of points defining an image boundary may be reduced in the list. Such reduction may greatly facilitate storage of the boundary definitions by reducing the total number of points to be stored. FIG. 5 illustrates reduction of the boundary points shown in FIG. 4 in this manner. For example, in the present implementation, when a boundary point is identified that has the same X or Y value as other boundary points immediately adjacent to it, the intermediate boundary point may be deleted from the list. In the illustrated example, points 52, 54 and 60 shown in FIG. 4 may thus be eliminated because a line between boundary points 42 and 62 inherently include these. Boundary point 58 is similarly excluded because it is included between a segment joining points 56 and 64. Similarly, intermediate boundary points such as point 50 may be eliminated, where desired, due to their position between other boundary points 46 and 56.

Figure 6:
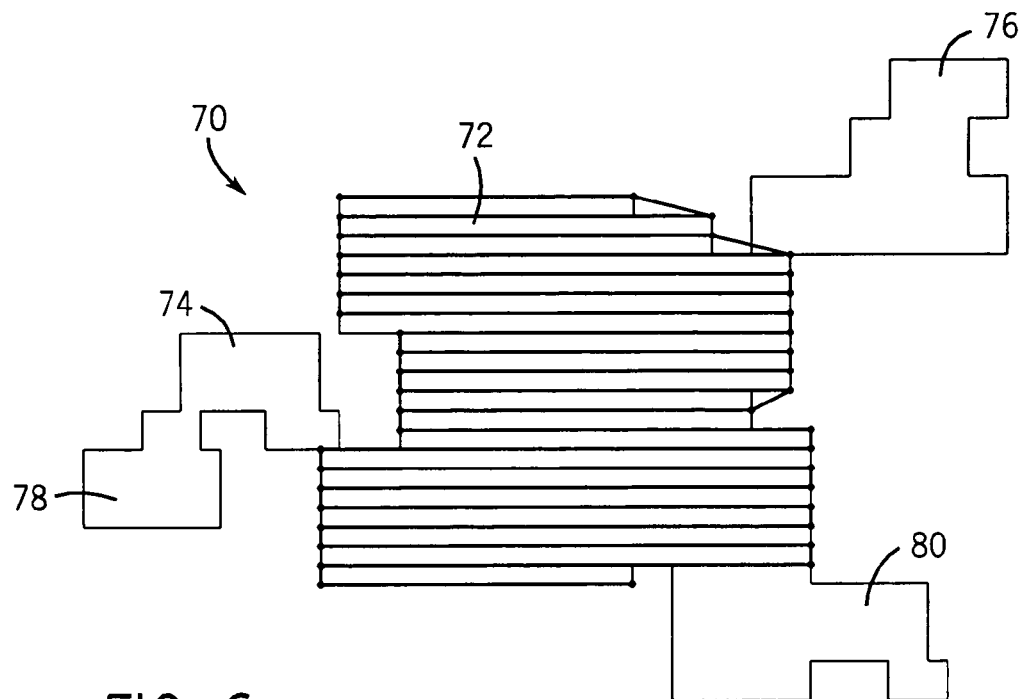
FIG. 6 is a diagram of a complex image object having a central region and occluded regions or arms that are analyzed and boundaries of which are determined in accordance with the present invention.

For relatively simple objects such as the object represented in FIGS. 3, 4 and 5, the foregoing techniques have been demonstrated to be particularly fast and computationally efficient. However, the same techniques may be used for identifying boundaries of more complex image objects, such as that shown in FIG. 6. The object of FIG. 6, designated generally by reference numeral 70, includes a central or main region 72, as well as a number of arm-like regions. It should be noted that the designated "central" region is completely arbitrary. In fact, processing may begin in any arm-like region and proceed in the manner described herein. Four typical arm-like regions will be encountered in image objects. These may include regions above and to the left of a previous region, as indicated at reference numeral 74, regions above and to the right of known regions, as indicated at reference numeral 76, regions below and to the left of known regions, as indicated at reference numeral 78, and regions below and to the right of known regions, as indicated at reference numeral 80.

Figure 7:
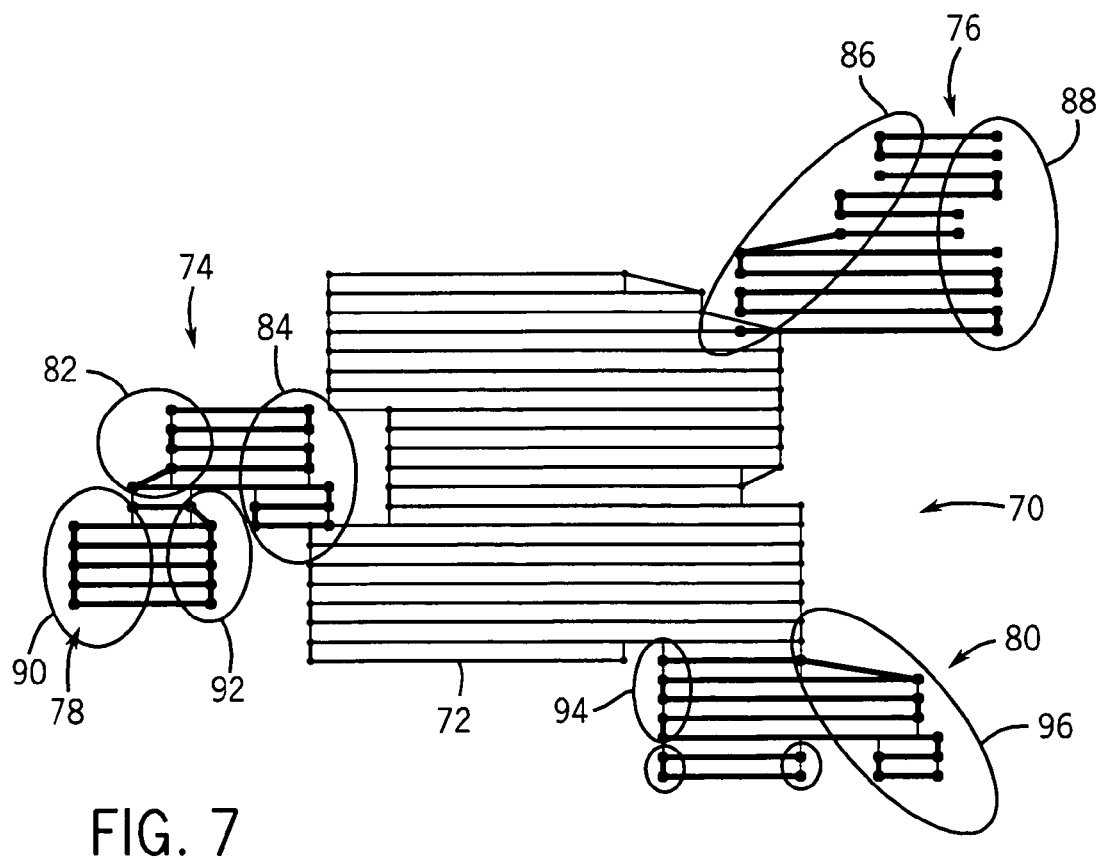
FIG. 7 is a diagram of the object of FIG. 6 during analysis of the boundary points.

Such regions can be analyzed, and their boundaries determined as follows. When an arm-like region is detected, processing of the current left and right points lists is interrupted to recursively develop a points list for the arm-like region. Upon returning from the recursion, the algorithm inserts the points lists for the arms into the appropriate points lists (left or right depending on which side of the object the arm was positioned). FIG. 7 is intended to illustrate how the algorithm recursively builds polygonal points lists for insertion into the outer points list.

Figure 8:
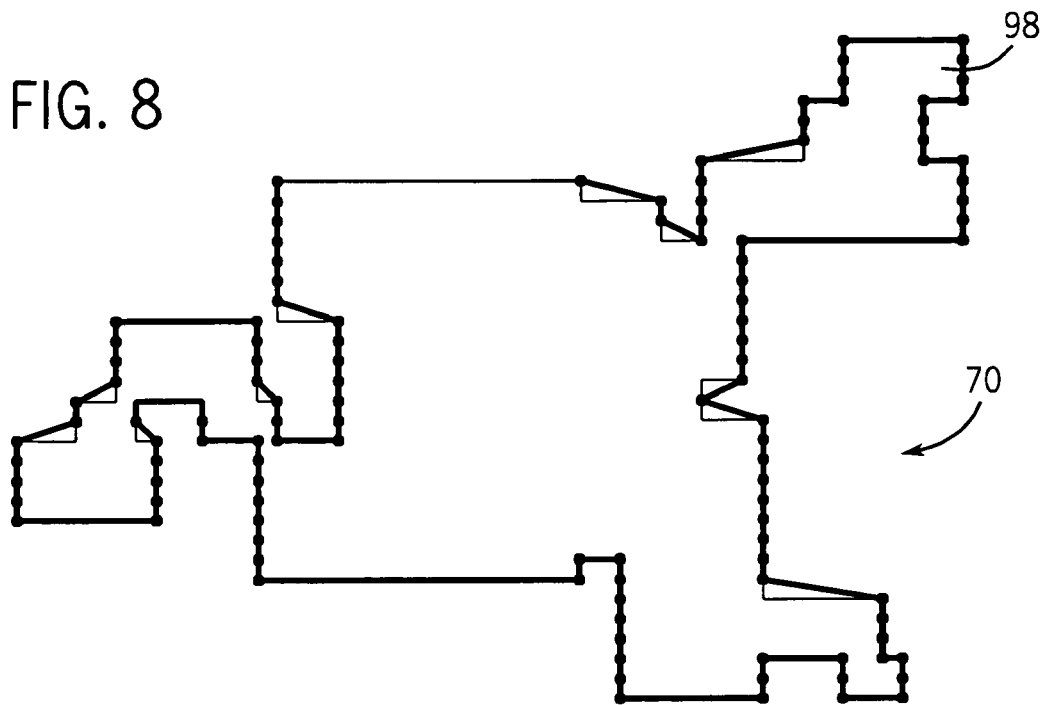
FIG. 8 is a diagram of the same object as shown in FIGS. 6 and 7 following identification of the boundary points.

Identification techniques for the boundaries of such arm-like regions are discussed in greater detail below. In general, however, such techniques may proceed generally as illustrated in FIG. 7. The processing will proceed through the central or main region 72 to identify its boundaries. Through the recursions into the arm-like regions, left boundaries 82 and right boundaries 84 will be identified for region 74, left boundaries 86 and right boundaries 88 will be identified for region 76, left boundaries 90 and right boundaries 92 will be identified for region 78, and left boundaries 94 and right boundaries 96 will be identified for region 80. It should be noted that many such recursions may be made by the algorithm, and that recursions within these recursions may take place, such as when additional arm-like regions are identified for during a recursion. Ultimately, then, a list of boundary points will be identified that represents the overall boundary 98 of the object as shown in FIG. 8. As noted above, many of these points may be eliminated from the final boundary points list by analysis of whether points lie between other points in a continuous segment.

Figure 9:
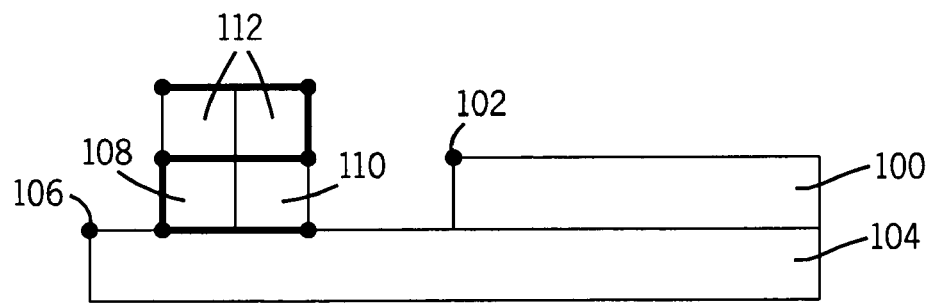
FIG. 9 is a diagram illustrating a recursive technique for identifying boundaries of occluded regions above and to the left of a previously identified region.

FIG. 9 represents a manner in which boundaries of arm-like regions above and to the left of a known region may be found by recursion. The boundary points of the known region are identified by scanning rows 100 to identify left of the leftmost boundary point 102. Subsequent lower rows 104 are then analyzed as described above, ultimately identifying a next leftmost boundary point 106. When the leftmost point 102 of a prior line is to the right of the leftmost point 106 of the subsequent lower line 104, the algorithm analyzes whether, on this next line 104, from the prior lines leftmost point 102 to the next line is leftmost point 106, pixels on the prior line are part of the current image object (e.g., of the same color) but have not been processed. When such a condition is found, the algorithm reverses the direction of progress from up-to-down and right-to-left, and recursively calls itself using this unprocessed pixel's X and the current line's Y addresses as the top "left" of a new polygonal area. The polygonal boundary point list is then generated for the pixels 108 and 110 of the first row of the arm-like region, as well as pixels 112 for subsequent rows. The resulting boundary point list is inserted into the current point list between the prior and next leftmost points. The process is repeated until the pixels to the next line's leftmost pixel have been analyzed.

Figure 10:
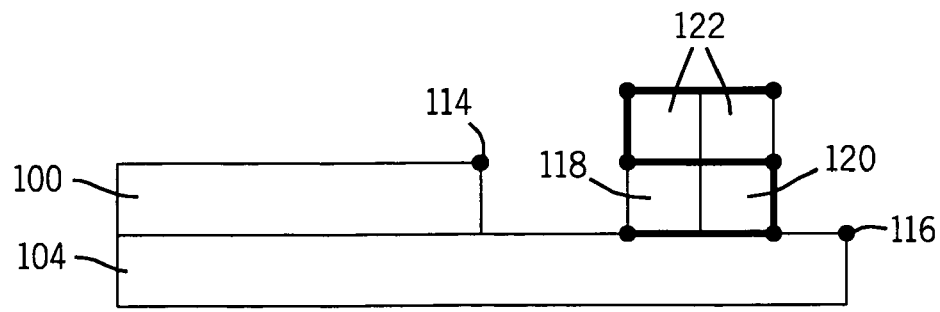
FIG. 10 is a diagram illustrating a similar identification for an occluded region above and to the right of a previously identified region.

FIG. 10 represents a similar technique for identifying boundaries of regions above and to the right of a know region. In this processing, when a rightmost pixel 114 is identified in a prior line that is to the left of the rightmost pixel 116 in the subsequent line, the algorithm examines, on this subsequent line, from the prior line's rightmost pixel 114 to the next line's rightmost pixel 116, to determine whether pixels on the prior line that belong to the current image object have not been processed. When such a condition is found, the algorithm reverses the direction from up-to-down (but does not reverse from right-to-left) and recursively calls itself using the unprocessed pixel's X and the current line's Y addresses as the top "left" of the new polygonal area. Thus, additional pixels 118 and 120 are found in the prior line, and subsequent pixels 122 are found, along with their boundaries for the arm-like region. The polygonal boundary point list that is returned is inserted into the current points list between the prior and its next rightmost points. The process is repeated until all pixels to the rightmost pixel have been analyzed.

Figure 11:
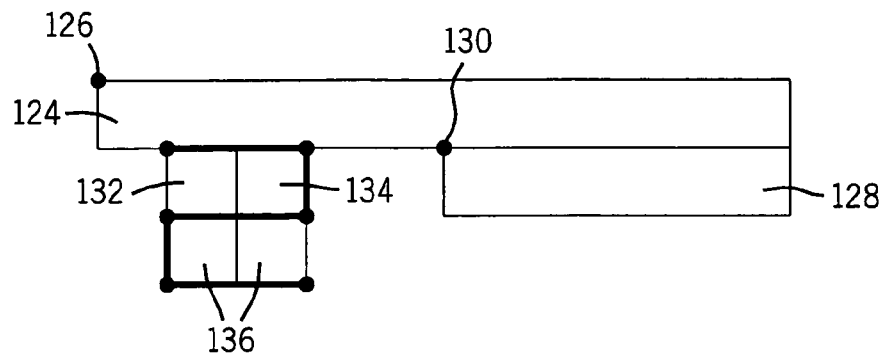
FIG. 11 is a diagram illustrating identification of boundaries of an occluded region below and to the left of a previously identified region.

FIG. 11 illustrates identification of boundary points for an arm-like region below and to the left of a known region. As illustrated in FIG. 11 from a prior line 124, a leftmost point 126 is identified, followed by analysis of a lower line 128. When the leftmost point 126 on the prior line is to the left of the leftmost point 130 on the next line 128, the algorithm determines, on this next line 128, from the prior line's leftmost point 126 to the next line's leftmost point 130, whether any pixels of the next line 128 belong to the current image object and have not been processed. When such a condition is found, the algorithm recursively calls itself (not reversing any directions) using this unprocessed pixel's X and the prior line's Y addresses as the top "left" of a new polygonal area. Thus, new pixels 132 and 134 of row 128 are identified, along with additional pixels 136 of the arm-like region, along with their boundary points. The polygonal boundary point list that is returned is inserted into the current points list between the prior and its next leftmost points. The process is repeated until all pixels of the next line's leftmost pixel have been analyzed.

Figure 12:
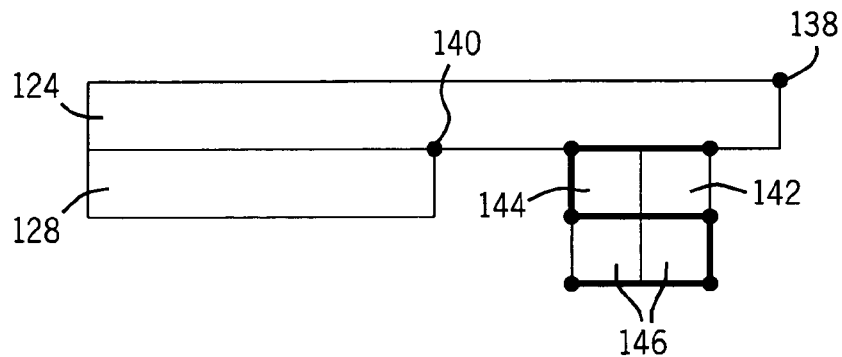
FIG. 12 is a diagram illustrating boundary identification of a similar occluded region below and to the right of a previously identified region.

Finally, FIG. 12 illustrates identification of boundary points for a region below and to the right of a known region. Again, the boundary points for a line 124 will have been examined, along with points for a line 128. When the rightmost boundary point 138 of the prior line 124 is to the right of the rightmost boundary point 140 of the next line 128, the algorithm determines, on this next line 128, from the prior line's rightmost point 138 to the next line's rightmost point 140 whether pixels on the next line 128 that belong to the current image object have not been processed. When such a condition is found, the algorithm reverses the direction of right-to-left (but does not reverse processing from up-to-down) and recursively calls itself using this unprocessed pixel's X and the prior line's Y address as the top "left" of a new polygonal area. Thus, pixels 142 and 144 in the example of FIG. 12 will be identified, as will additional pixels 146 of the arm-like region, along with their respective boundary points. The polygonal boundary point list that is returned is inserted into the current points list between the prior and its next rightmost points. The process is repeated until all pixels to the rightmost pixel have been analyzed.

Figure 13:
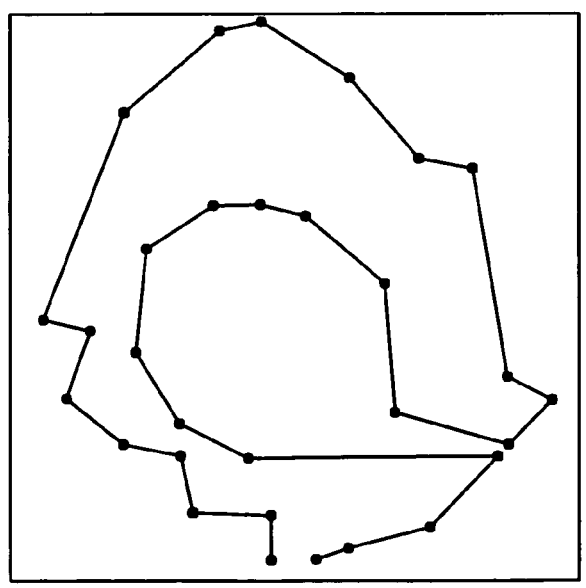
FIG. 13 is an exemplary boundary output generated from a list of boundary points for one of the image objects of the image of FIGS. 1 and 2.

The foregoing processing has demonstrated the ability to accurately identify boundaries for complex regions in 2D images in a very computationally efficient manner. Accordingly, the technique facilitates rapid analysis of 2D images, and of various desired image objects that can be discriminated within the 2D images. FIG. 13 is an exemplary boundary mapping for the wheel 20 and color region 26 of FIGS. 1 and 2. It has been found that such boundaries are largely sufficient for most purposes, including tagging within documents, labeling, and so forth. Additional and enhanced detail may be provided by limiting the degree to which areas are added or deleted from the bounded area as described above.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for determining boundaries of image objects visible in a digitized two-dimensional image, the method comprising:
   (a) identifying a first pixel of the image object as a target pixel;
   (b) identifying additional pixels adjacent to the target pixel along line in a desired direction from the target pixel based upon a common quality between the pixels until a boundary pixel of the image object is reached;
   (c) identifying a further boundary pixel in another line adjacent to but offset orthogonally from the line of step (b) by reference to the boundary pixel;
   (d) repeating steps (b) and (c) using the further boundary pixel of step (c) as the target pixel of step (b) until no further adjacent pixels of the image object are identified; and
   (e) storing lists of the left and right boundary pixels; and
   (f) reversing either the left or right boundary pixel lists and concatenating the two to produce a single boundary pixel list that defines a series of line segments that describe a polygon outlining the image object.

2. The method of claim 1, wherein the first pixel is a boundary pixel of the image object.

3. The method of claim 1, wherein the desired direction is horizontal.

4. The method of claim 1, further comprising identifying boundary pixels of contiguous, occluded regions of the image object by identifying pixels of lines adjacent to a line of identified image object pixels and repeating steps (b) and (C)

using any one of the pixels of the line of identified image object pixels as the target pixel for such contiguous, occluded regions.

5. The method of claim 1, further comprising reducing the boundary pixel list by eliminating intermediate pixels on the list lying in a line between other pixels on the list.

6. The method of claim 1, further comprising reducing the boundary pixel list by eliminating pixels representing vertices of triangles defined by three sequential pixels on the list.

7. The method of claim 1, wherein the common quality is color.

8. A method for determining boundaries of image objects visible in a digitized two-dimensional image, the method comprising:
   (a) identifying a first boundary pixel of the image object at a upper leftmost position in the image object;
   (b) identifying additional pixels of the image object in a first row with the first boundary pixel based upon a common quality between the pixels until a rightmost boundary pixel of the image object is reached in the first row;
   (c) identifying a rightmost boundary pixel in a second row beneath the first row;
   (d) identifying additional pixels of the image object in the second row based upon the common quality between the pixels until a leftmost boundary pixel of the image object is reached in the second row;
   (e) identifying an additional leftmost boundary pixel of the image object in a third row beneath the second row;
   (f) repeating steps (b) through (e) for the third and all lower rows until no further pixels of the image object are identified; and
   (g) storing a list of the boundary pixels.

9. The method of claim 8, wherein the first pixel is a boundary pixel of the image object.

10. The method of claim 8, further comprising identifying boundary pixels of contiguous, occluded regions of the image object by identifying pixels of lines adjacent to a line of identified image object pixels and sequentially identifying boundary pixels of such contiguous occluded regions.

11. The method of claim 10, wherein the boundary pixels of the contiguous, occluded regions are identified recursively during identification of the boundary pixels of a main image object region.

12. The method of claim 8, further comprising reducing the boundary pixel list by eliminating intermediate pixels on the list lying in a line between other pixels on the list.

13. The method of claim 8, further comprising reducing the boundary pixel list by eliminating pixels representing vertices of triangles defined by three sequential pixels on the list.

14. The method of claim 8, wherein the common quality is color.

15. A method for determining boundaries of image objects visible in a digitized two-dimensional image, the method comprising:
   identifying a first boundary pixel of the image object and additional pixels of the image object in a line with the first boundary pixel based upon a common quality between the pixels until a second boundary pixel is identified at an end of the line opposite the first boundary pixel; and
   sequentially identifying image boundary pixels in adjacent lines of the image by identifying adjacent pixels in lines based upon the common quality; and
   storing a list of the boundary pixels.

16. The method of claim 15, further comprising identifying boundary pixels of contiguous, occluded regions of the image object by identifying pixels of lines adjacent to a line of identified image object pixels and sequentially identifying boundary pixels of such contiguous occluded regions.

17. The method of claim 16, wherein the boundary pixels of the contiguous, occluded regions are identified recursively during identification of the boundary pixels of a main image object region.

18. The method of claim 15, further comprising reducing the boundary pixel list by eliminating intermediate pixels on the list lying in a line between other pixels on the list.

19. The method of claim 15, further comprising reducing the boundary pixel list by eliminating pixels representing vertices of triangles defined by three sequential pixels on the list.

20. The method of claim 15, wherein the common quality is color.

* * * * *